3,098,714
PROCESS FOR THE MANUFACTURE OF HYDROGEN PEROXIDE
Gerhard Käbisch, Rheinfelden, and Hans Herzog, Konstanz, Germany, assignors, by mesne assignments, to FMC Corporation, a corporation of Delaware
No Drawing. Filed June 7, 1960, Ser. No. 34,351
Claims priority, application Germany June 13, 1959
4 Claims. (Cl. 23—207)

This invention relates to the manufacture of hydrogen peroxide by the anthraquinone process, and particularly to an improvement in that process whereby the activity of the hydrogenation catalyst employed therein is increased.

In the anthraquinone process for producing hydrogen peroxide, an alkylated anthraquinone working compound or carrier is dissolved in a solvent, and the work solution thus obtained is run through several stages of a cyclic process. As used herein, the term "anthraquinone" includes tetrahydro derivatives thereof, that is, the tetrahydroanthraquinones. In the first stage, the work compound in solution is hydrogenated in the presence of a hydrogenation catalyst to the extent that about 50 to 70% of the alkylated anthraquinone, e.g. 2-ethyl anthraquinone, is converted into the hydroquinone form. The hydrogenated work compound is then oxidized by treatment with a gas which contains oxygen. In the oxidation, the 2-ethyl anthraquinone is reformed, and hydrogen peroxide is produced simultaneously. The peroxide then is washed out in the extraction stage, with water. In the last stage the work solution is purified, for example, with aluminum oxide, and again fed into the hydrogenation stage. The amount of aluminum oxide, or other purifying agent, which is destroyed during purification depends on the amount of by-products, which in turn are produced almost exclusively in the hydrogenation stage. As a general rule, the amount of by-products produced is directly proportional to the concentration of hydrogenation catalyst used. This means that a highly-active catalyst supplies the least by-products.

Air, water and aluminum oxide are the raw materials consumed by the reaction to produce hydrogen peroxide. However, losses in work solution resulting from byproduct formation, and the relatively high costs for the hydrogenation catalyst, must also be added in a cost calculation. Accordingly, as a practical matter, the following items constitute the principal elements of cost in the process:

Hydrogenation catalyst
Work solution loss due to by-product formation
Aluminum oxide consumption
Hydrogen consumption As would be expected, there have been numerous attempts to reduce these principal costs to a minimum, and numerous patents relate to inventions made as a result of these attempts. These patents can be divided into two group.

The first group involves patents in which by-product formation is reduced by subjecting the hydrogenation catalyst to a preliminary treatment. Nitrites (U.S. 2,720,531), nitriles (U.S. 2,720,532), amines (U.S. 2,730,533), and pyridines (U.S. 2,756,243) are proposed for pretreatment; pretreatment agents for the most part are alkaline, nitrogen-containing substances. At the former BASF plant, as has been described in numerous BIOS, CIOS, and FIAT reports, water-soluble alkalinereacting ammonium salts were used for pretreatment of the hydrogenation catalyst. It is common to all processes of the first group that the catalyst is made more selective by the pretreatment, and thus by-product formation is reduced. However, a quite considerable reduction in activity of the hydrogenation catalyst is also linked to the pretreatment, so that over-all catalyst costs rise considerably.

The second group of patents cover processes in which it is recommended to add to the work solution, substances causing a reduction in by-product formation. German Patent 1,041,928 recommends the addition of chlorinecontaining compounds in order to direct hydrogenation in a desired direction. It is recommended in British Patent 795,272 that organic nitrogen-containing substances be added to the work solution. It is stated that these compounds should be as water-insoluble as possible, or their water solubility at 25° C. should not amount to more than two grams per liter, since they would otherwise be washed out in the extraction stage.

In comparison with the first group of processes, the second group also has the advantage of reducing the amount of by-products; however, when the organic nitrogen-containing compound is added to the working solution, as in British Patent 795,272, the activity of the hydrogenation catalysts remain substantially unchanged.

It has now been found, quite surprisingly, that when alkaline-reacting substances which are water-soluble, rather than water-insoluble, are added to the work solution, and particularly when ammonia, ammonium salts, or water-soluble amines are added thereto, the activity of the hydrogenation catalysts is increased several times. This discovery is all the more surprising in that it was previously assumed that such compounds poison the catalyst. Along with the quite considerable increase in activity of the hydrogenation catalysts which is obtained with the process, there is associated a better hydrogen utilization, a lesser aluminum oxide requirement, and a smaller loss in work solution by the formation of by-products. That is, all of the above-mentioned principal costs of the process are reduced.

The alkaline-reacting water-soluble substance suitably is employed in the process of the present invention in a concentration within the limits of $1 \times 10^{-6}$–$1 \times 10^{-1}$, and preferably $1 \times 10^{-4}$ to $1 \times 10^{-2}$, mols per liter of work solution.

In determining the amount of water-soluble alkalinereacting substances to be used in the work solution, it should also be considered that use of too much of the additive makes it possible for the hydrogen peroxide taken off in the extraction stage to become alkaline; this favors decomposition of the peroxide product. The maximal amount added should be that amount at which the pH value of the hydrogen peroxide remains below 8. This amount depends on various factors, e.g., the solubility of water in the work solution, and the loading of the work solution with hydrogen peroxide, and can vary within wide limits from work solution to work solution.

The following examples and tables show how the activity of the hydrogenation catalyst increases when the present alkaline-reacting water-soluble substance is used in the work solution. However, it should be expressly understood that the process according to the invention is not to be limited to the showings of the examples. Thus, monosubstituted or poly-substituted anthraquinones can be applied as reaction carriers; the substituents may be alkyl, halogen, or alkoxy, groups, or mixtures thereof. The solvents in the work solution can be aliphatic, cycloaliphatic or aromatic alcohols or their esters, phosphoric acid esters, ketones, hydrocarbons with 6 to 20 carbon atoms, or these solvents having halogen substituents; or mixtures of these solvents. Suspension, fluid bed, and fixed bed hydrogenation catalysts can be employed, and firmly installed catalytically-acting meshes, sieves, etc.

can be utilized for hydrogenation. The catalytically-acting metals, preferably the noble metals such as palladium or platinum, can be used alone or precipitated on carriers.

Lyes and alkaline-reacting salts of alkali metals and alkaline earth metals can be used herein as water-soluble, alkaline-reacting additives, as well as alkaline-reacting oxides, ammonia, ammonium salts and water-soluble amines. By reason of good solubility in the organic work solution, water-soluble amines, ammonia and ammonium salts are especially preferred, and of these, ammonia and gaseous amines are particularly suitable because of ease of operation and the possibility of expelling the additive in the oxidation zone.

EXAMPLE 1

One hundred cubic centimeter samples of work solution were hydrogenated in a stirring apparatus in the presence of 20 mgs. of platinum black at room temperature and normal pressure. One hundred grams of 2-ethyl anthraquinone were contained per liter of work solution, dissolved in a mixture of forty volume percent of 1-methyl naphthalene and 60 volume percent of octyl alcohol. Hydrogenation activity, that is hydrogen take-up in 100 cc. of work solution per minute, is a measure of hydrogenation rate. The relative moisture of the work solution remained the same in all experiments.

Table I

| Additive | Concentration (mol/l.) | Hydrogenation Activity (cc./min.) |
|---|---|---|
| None | None | 45 |
| $NH_3$ | $3.2 \times 10^{-5}$ | 60 |
| $NH_3$ | $4.4 \times 10^{-4}$ | 80 |
| $NH_3$ | $4.4 \times 10^{-3}$ | 108 |
| $NH_3$ | $4.3 \times 10^{-2}$ | 120 |
| $NH_3$ | $8.8 \times 10^{-2}$ | 170 |

As is seen from the table, hydrogenation activity increases with concentration; at a concentration of $4 \times 10^{-4}$ mols per liter, it approaches twice the value of the pure work solution.

The following table shows the influence of various alkaline substances of comparable concentration on hydrogenation rate.

Table II

| Additive | Concentration (mol/l.) | Hydrogenation Activity (cc./min.) |
|---|---|---|
| $NH_3$ | $4.4 \times 10^{-3}$ | 108 |
| $(NH_4)_2CO_3$ | $3.3 \times 10^{-3}$ | 110 |
| $K_2CO_3$ | $3.3 \times 10^{-3}$ | 50 |
| $NaOH$ | $3.5 \times 10^{-3}$ | 50 |
| None | None | 45 |

The varying effectiveness of the activators is to be attributed to their varyingly good solubility in the work solution. Still higher concentrations are obtained most readily with ammonia and amines.

EXAMPLE 2

One hundred cubic centimeter samples of the work solution of Example 1 were hydrogenated in a shaker flask in the presence of 30 cc. of the indicated supported catalyst of the types used with fixed bed and suspension catalyst systems.

Table III

| Catalytic Procedure | Additive | $NH_3$ Concentration (mol/l.) | Hydrogenation Activity (cc./min.) |
|---|---|---|---|
| Fixed bed catalyst, 0.8% Pd on $Al_2O_3$ | None | None | 28 |
| Do | $NH_3$ | $4.3 \times 10^{-2}$ | 39 |
| Carrier suspension 1% Pd on $Al_2O_3$ | None | None | 52 |
| Do | $NH_3$ | $4.3 \times 10^{-2}$ | 75 |

Both examples show a distinctly accelerating effect on the part of the ammonia.

EXAMPLE 3

At a flow of 400 l. per hour and a temperature of 30° C., the work solution described in Example 1 was hydrogenated without pressure in a cyclic apparatus until a 50% conversion of the 2-ethyl anthraquinone was achieved. A palladium suspension catalyst served as hydrogenation catalyst. The palladium consumption amounted to two grams per hour at a hydrogen peroxide production of 2.75 kg. 100% $H_2O_2$ per hour.

When 40 l. per hour of gaseous ammonia was additionally introduced into the hydrogenation apparatus, the hourly addition of palladium catalyst at equal yield was reduced to 1 g.

What is claimed is:

1. In the manufacture of hydrogen peroxide by the cyclic process of hydrogenating a work solution containing an alkylated anthraquinone in the presence of a noble metal catalyst selected from the group consisting of platinum and palladium to produce the corresponding alkylated anthrahydroquinone, oxidizing said alkylated anthrahydroquinone to produce hydrogen peroxide and reform said alkylated anthraquinone, and extracting said hydrogen peroxide from said work solution, the improvement which comprises adding an alkaline, water-soluble compound to said work solution of a type which is capable of significantly raising the pH of said solution, in the amount of about $1 \times 10^{-6}$ to $1 \times 10^{-1}$ moles per liter, said compound being selected from the group consisting of alkali metal salts, alkaline earth metal salts, alkali metal hydroxides, alkaline earth metal hydroxides, alkali metal oxides, alkaline earth metal oxides, ammonia, ammonium salts and water-soluble amines, and carrying out said catalytic hydrogenation of said solution of said alkylated anthraquinone in the presence of said compound, said compound increasing the activity of said catalyst during hydrogenation and then passing said solution to said oxidation stage.

2. Process of claim 1 wherein the alkaline, water-soluble additive is a material from the group consisting of ammonia, ammonum salts and water-soluble amines.

3. Process of claim 2 wherein the water-soluble additive is employed in the work solution in the amount of about $1 \times 10^{-4}$ to $1 \times 10^{-2}$ mols per liter.

4. Process of claim 2 wherein the alkaline, water-soluble additive is gaseous ammonia.

References Cited in the file of this patent

UNITED STATES PATENTS

| 2,756,243 | Umhoefer | July 24, 1956 |
| 2,860,036 | Lait | Nov. 11, 1958 |
| 2,909,532 | Cosby et al. | Oct. 20, 1959 |
| 2,925,391 | Lait | Feb. 16, 1960 |